(12) United States Patent
Roth et al.

(10) Patent No.: US 12,134,521 B2
(45) Date of Patent: Nov. 5, 2024

(54) AUTOMATED IN-RACK PICKING

(71) Applicant: Walmart Apollo, LLC, Bentonville, AR (US)

(72) Inventors: Brian C. Roth, Bentonville, AR (US); Paul Durkee, Centerton, AR (US); Ben Edwards, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 58 days.

(21) Appl. No.: 18/072,170

(22) Filed: Nov. 30, 2022

(65) Prior Publication Data
US 2023/0092053 A1 Mar. 23, 2023

Related U.S. Application Data

(63) Continuation of application No. 16/887,211, filed on May 29, 2020, now abandoned.

(60) Provisional application No. 62/868,861, filed on Jun. 28, 2019.

(51) Int. Cl.
| | |
|---|---|
| *G06F 7/00* | (2006.01) |
| *B25J 9/16* | (2006.01) |
| *B25J 15/00* | (2006.01) |
| *B65G 1/137* | (2006.01) |
| *G06Q 10/087* | (2023.01) |

(52) U.S. Cl.
CPC .......... *B65G 1/1378* (2013.01); *B25J 9/1679* (2013.01); *B25J 15/0019* (2013.01); *G06Q 10/087* (2013.01)

(58) Field of Classification Search
CPC .... B65G 1/1378; B65G 1/1376; B25J 9/1679; B25J 15/0019; B25J 15/04; B25J 19/0029; G06Q 10/087

USPC ................ 700/213–214, 216, 228
See application file for complete search history.

(56) References Cited

U.S. PATENT DOCUMENTS

| | | | |
|---|---|---|---|
| 6,535,790 B2 | 3/2003 | Nakano et al. | |
| 7,234,744 B2 | 6/2007 | Osten et al. | |
| 8,965,560 B2 | 2/2015 | Mathi et al. | |
| 9,327,397 B1 | 5/2016 | Williams et al. | |

(Continued)

OTHER PUBLICATIONS

Alblaihess, Mohamad et al., "Designing a Robotic Arm for Moving and Sorting Scraps at Pacific Can, Beijing, China", Worcester Polytechnic Institute, date unknown, 139 pages.

*Primary Examiner* — Yolanda R Cumbess
(74) *Attorney, Agent, or Firm* — Foley IP Law, PLLC

(57) ABSTRACT

An automated in-rack picking solution enables improved efficiency by permitting automatic reconfiguration of automated picking system (APS) deployments within an automated storage and retrieval system (ASRS). The storage volume of an ASRS can be more thoroughly utilized, even with a smaller number of APSs, when at least one APS is operable to autonomously relocate within the ASRS based at least on a stored item's location and/or property (e.g., suitability for handling by a particular end effector). An exemplary solution includes an APS positioned to reach stored items within a first subset of storage locations when affixed to a first attachment point; a transport component operable to relocate the APS to a second attachment point, wherein the APS is positioned to reach stored items within a second subset of the storage locations when affixed to the second attachment point; and a controller operable to instruct relocation of the APS.

18 Claims, 6 Drawing Sheets

(56) References Cited

U.S. PATENT DOCUMENTS

| | | | |
|---|---|---|---|
| 9,733,646 B1 * | 8/2017 | Nusser | B65G 57/03 |
| 10,399,778 B1 * | 9/2019 | Shekhawat | B65G 1/1373 |
| 2012/0179337 A1 | 7/2012 | Doan | |
| 2016/0132059 A1 * | 5/2016 | Mason | B25J 9/1697 |
| | | | 701/28 |
| 2016/0280460 A1 | 9/2016 | Porat | |
| 2018/0141755 A1 | 5/2018 | Khodl et al. | |
| 2018/0346246 A1 | 12/2018 | Grinnell et al. | |

* cited by examiner

AUTOMATED IN-RACK PICKING

This application is a continuation of U.S. patent application Ser. No. 16/887,211, filed May 29, 2020, entitled "Automated In-Rack Picking", which claims the benefit U.S. Provisional Application No. 62/868,861, filed Jun. 28, 2019, entitled "Automated In-Rack Picking," which are incorporated by reference herein in their entireties.

BACKGROUND

Automated storage and retrieval systems (ASRSs) offer the potential to improve the efficiency of large retail and warehousing operations. However, each storage position within an ASRS must be reachable, or the ASRS itself may introduce inefficiencies by having wasted or under-utilized storage volume. This drives the ASRS to have a large number of automated picking systems (APSs), such as robotic arms.

An additional challenge becomes apparent when considering that various stored items place different requirements on APSs, due to differing size, weight, rigidity, surface texture, and other factors that drive APS requirements, such as weight capacity, reach, and end effector type (e.g., grabbing mechanism). For example, some stored items are sufficiently rigid to be handled with robotic fingers or a clamp, whereas other stored items could be damaged if handled by an APS with a clamping action. This can drive the need to either configure an ASRS for a particular type of stored item (and expend labor to reconfigure it when the stored items change), or to provide potentially superfluous APS s (or components) in order to be prepared for storing varying types of items requiring differing end effectors.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

An automated in-rack picking solution enables improved efficiency by permitting automatic reconfiguration of automated picking system (APS) deployments within an automated storage and retrieval system (ASRS). The storage volume of an ASRS can be more thoroughly utilized, even with a smaller number of APSs, when at least one APS is operable to autonomously relocate within the ASRS based at least on a stored item's location and/or property (e.g., suitability for handling by a particular end effector). An exemplary solution includes an APS positioned to reach stored items within a first subset of storage locations when affixed to a first attachment point; a transport component operable to relocate the APS to a second attachment point, wherein the APS is positioned to reach stored items within a second subset of the storage locations when affixed to the second attachment point; and a controller operable to instruct relocation of the APS.

BRIEF DESCRIPTION OF THE DRAWINGS

The disclosed examples are described in detail below with reference to the accompanying drawing figures listed below.

Figure 1:
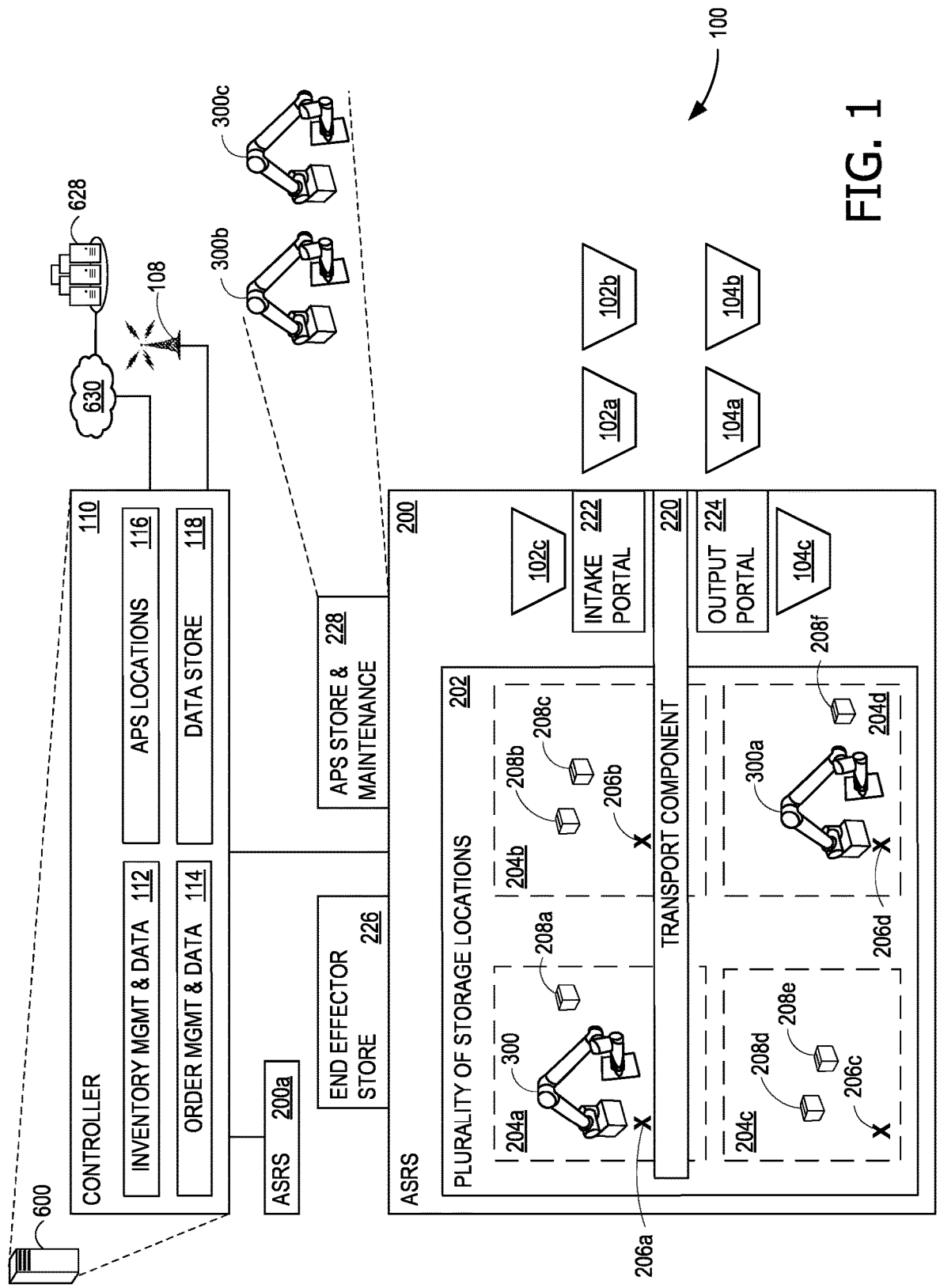
FIG. 1 illustrates an exemplary in-rack picking arrangement.

Corresponding reference characters indicate corresponding parts throughout the drawings. Elements in the figures are illustrated for simplicity and clarity and have not necessarily been drawn to scale. For example, the dimensions and/or relative positioning of some of the elements in the figures may be exaggerated relative to other elements to help to improve understanding. Also, common but well-understood elements that are useful or necessary in a commercially feasible embodiment may not be depicted, in order to facilitate a less obstructed view.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . ." For brevity and clarity, this implied leading clause is not repeated ad nauseum.

Automated storage and retrieval systems (ASRSs) offer the potential to improve the efficiency of large retail and warehousing operations. However, each storage position within an ASRS must be reachable, or the ASRS itself may introduce inefficiencies by having wasted or under-utilized storage volume. This drives the ASRS to have a large number of automated picking systems (APSs), such as robotic arms. An additional challenge becomes apparent when considering that various stored items place different requirements on APSs, due to differing size, weight, rigidity, surface texture, and other factors that drive APS requirements, such as weight capacity, reach, and end effector type (e.g., grabbing mechanism). For example, some stored items are sufficiently rigid to be handled with robotic fingers or a clamp, whereas other stored items could be damaged if handled by an APS with a clamping action. This can drive the need to either configure an ASRS for a particular type of stored item (and expend labor to reconfigure it when the stored items change), or to provide potentially superfluous APSs (or components) in order to be prepared for storing varying types of items requiring differing end effectors.

Traditional shuttle systems typically include a storage matrix for storing items, for example, a designated storage area and an external port to dispense items. This has driven design of racking which has limited the storage density of traditional ASRSs. Arrangements that require a human to move items into and out of racking drive designs that include a pick station on the side of a racking structure to accommodate a human. This increases the distance that stored items must be moved, introducing inefficiencies in shuttle operations. Even for partially automated configurations, product storage totes are typically brought to a robotic picker for items to be picked from the product storage tote and placed into a customer order tote. However, robotic pick arms typically do not require the same amount of free volume, within a storage arrangement, as do humans. Thus, using robotic pickers located throughout the racking, storage density can be increased. This reduces the total travel distances of the totes when items need to be moved from a storage tote to an order tote.

Therefore, an automated in-rack picking solution enables improved efficiency by permitting automatic reconfiguration of APS deployments within an ASRS. The storage volume of an ASRS can be more thoroughly utilized, even with a smaller number of APSs, when at least one APS is operable to autonomously relocate within the ASRS based at least on a stored item's location and/or property (e.g., suitability for handling by a particular end effector). An exemplary solution includes an APS positioned to reach stored items within a first subset of storage locations when affixed to a first attachment point; a transport component operable to relocate the APS to a second attachment point, wherein the APS is positioned to reach stored items within a second subset of the storage locations when affixed to the second attachment point; and a controller operable to instruct relocation of the APS.

Strategically placed APSs (e.g., robotic pick stations) installed at various points throughout an ASRS (e.g., an automated storage structure) minimize the mean shuttle distance traveled for order completion, such as when filling totes (carried by a transport component) with stored items to fulfill a customer order. Examples of the disclosure include robot pickers for picking items from a product storage tote and placed them into a customer order tote. Examples advantageously use robotic pickers, which increase storage density and reduce total travel of the totes, when stored items are to be moved from storage totes to order totes. APSs are selected and positioned so that each APS can best pick the stored items in its vicinity. Thus, an APS may be selected for a particular operating position, based at least in part on the end effector of the APS, and whether that particular end effector is suitable for handling the stored items to be placed into or retrieved from a storage location.

In some examples, a controller tracks the locations of the APSs in real time, which would not be necessary for a set of fixed-position APSs. In some examples, the APSs and totes are configured so that the same transport component can both move totes and relocate the APSs. In some examples, when an APS arrives at an assigned operational location, it is affixed to an attachment point in a manner that optimizes and aligns with the storage configuration around it. In some examples, power and communication coupling are provided within the racking, in order to power the APSs and permit the APSs to report their locations and receive both picking instructions and relocation instructions. The arrangement is reconfigurable in a way that APSs can be removed, placed, replaced, supplemented, and modified. This enables accommodating seasonal changes, for example, holiday shopping surges which generally requires more pickers in the racking for increasing the throughput of automated order fulfillment. During periods of lesser throughput demand, the storage space of an ASRS can be used, even when the number of APSs deployed cannot reach the full extent of the storage space of the ASRS—because the APSs can relocate as needed. This advantageously reduces the number of APSs deployed, which provides potential savings of operational expenses.

Determining the location of each APS (and the type of APS for each location) is not arbitrary, but is rather flexible and intelligently deliberate. That is APSs are deployed at least partially based on product stock-keeping units (SKUs), which differentiates products by attribute, such as material, size, packaging, and other factors. For example, an APS can be selected for positioning based on the compatibility of its end effector and weight capacity with the stored item to be handled. Additionally, APSs can be deployed in spaces that are too tight or potentially less safe for continuous human occupancy. Thus, in some example, an APS is selected for positioning based on the compatibility of its movement geometry and the confines of the space available for APS operation at a particular APS attachment point. The number of deployed APSs is variable, in some examples, based on the throughput required.

FIG. 1 illustrates an exemplary in-rack picking arrangement 100 that includes an ASRS 200 and a first relocatable APS 300. ASRS 200 is illustrated in further detail in FIG. 2, and relocatable APS 300 is illustrated in further detail in FIG. 300. Arrangement 100 includes a controller 110, which in some examples, is implemented using at least a portion of a computing node 600, which is illustrated in further detail in FIG. 6. Controller 110 includes at least a portion of the data and instructions required to perform the operations described herein for arrangement 100, including an inventory management and data component 112, an order management and data component 114, APS location data 116, and a local data store 118.

Controller 110 uses inventory management and data component 112 to control a transport component 220 to intake totes 102a-102c, bringing in stored items 208a-208f through an intake portal 222, and distribute stored items 208a-208f at varying locations among a plurality of storage locations 202. In some examples, plurality of storage locations 202 includes shelves and bins. In some examples, plurality of storage locations 202 use product storage totes (e.g., tote 102c and others) for storing stored items 208a-208f. Controller 110 also controls relocatable APS 300 and a second relocatable APS 300a (and other deployed APSs, as necessary) to pick stored items 208a-208f from intake totes 102a-102c and/or to remove intake totes 102a-102c from transport component 220 to place them in plurality of storage locations 202. Controller 110 also uses order management and data component 114 to control relocatable APSs 300 and 300a (and others), along with transport component 220, to retrieve selected ones of stored items 208a-208f, place them in one of order totes 104a-104c, and output them through an output portal 224.

Within ASRS 200 is a plurality of APS attachment points 206a-206d, where relocatable APSs 300 and 300a may become affixed in order to perform automated in-rack picking operations. In some examples, APS attachment points 206a-206d are structurally hardened points that are suitable for clamping and can support the physical stresses imposed by APS 300. With relocatable APS 300 or 300a located at various ones of APS attachment points 206a-206d, stored items located within different subsets of the plurality of storage locations 202 can be reached. For example, when relocatable APS 300 is affixed to APS attachment point 206a, relocatable APS 300 is positioned to reach stored item 208a within a subset 204a of plurality of storage locations 202 within ASRS 200. Likewise, when relocatable APS 300a is affixed to APS attachment point 206d, relocatable APS 300a is positioned to reach stored item 208f within a subset 204d of plurality of storage locations 202 within ASRS 200.

When relocatable APS 300 relocates and affixes to APS attachment point 206b, relocatable APS 300 will be positioned to reach stored items 208b and 208c within a subset 204b. Similarly, when relocatable APS 300 relocates and affixes to APS attachment point 206c, relocatable APS 300 will be positioned to reach stored items 208d and 208e within a subset 204c. Alternatively, relocatable APS 300a can relocate to reach stored items 208b and 208c or 208d and 208e. Although FIG. 1 illustrates separate subsets 204a-204d each with a single APS attachment point 206a-206d, it should be understood that, in some examples, subsets of plurality of storage locations 202 can overlap and have multiple APS attachment points so that both relocatable APSs 300 and 300a can both reach a common set of stored items (e.g., 208b and 208c). This arrangement would be useful if different stored items within reach of multiple APS attachment points are best handled with different end effectors (e.g., clamping fingers, a spatula, a suction component, or another end effector). In some examples, a plurality of end effectors is stored within an end effector store 226, to provide for different handling options for stored items. In some examples, additional relocatable APSs 300b and 300c (or a different number) are waiting in an APS store and maintenance location 228 for deployment within ASRS 200.

APS location data 116 stores location information for relocatable APSs 300 and 300a, so that controller 110 can instruct relocatable APSs 300 and 300a to pick certain ones of stored items 208a-208f and determine a need to relocate one or more of relocatable APSs 300 and 300a-300c. As illustrated, controller 110 also controls operations of a second ASRS 200a, although in some examples, controller 110 controls operations of a different number of ASRSs (e.g., a single ASRS or a larger number). Controller 110 uses a communication component 108 to provide a communication channel to at least relocatable APSs 300 and 300a, ASRSs 200 and 200a, and transport component 220. Also as illustrated, controller 110 communicates with a cloud resource 628 across a network 630, both of which are described in further detail in relation to FIG. 6. Controller 110 uses local data store 118 for other data necessary to manage the operations described herein.

Figure 2:
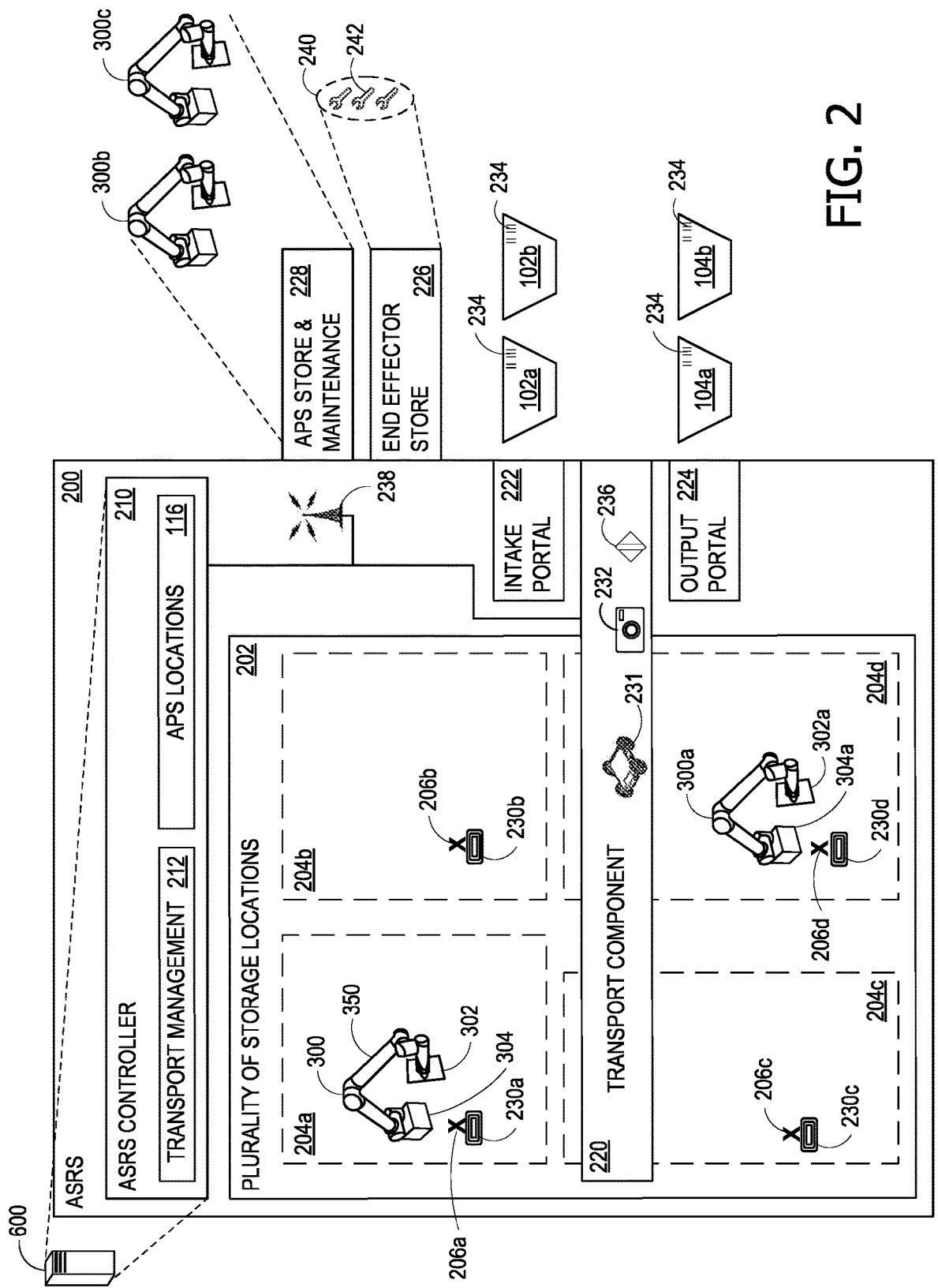
FIG. 2 illustrates a block diagram of an exemplary automated storage and retrieval system (ASRS) useable within the automated in-rack picking arrangement of FIG. 1.

FIG. 2 illustrates a block diagram of ASRS 200. ASRS 200 includes an ASRS controller 210, which in some examples, is implemented using at least a portion of a computing node 600 (of FIG. 6). ASRS controller 210 includes a transport management component 212, and some examples also have a copy of APS location data 116. Transport management component 212 controls the operations of transport component 220. As illustrated, transport component 220 includes a conveyor component 231, which can include a conveyor assembly (e.g., rollers and/or belt), a shuttle, an autonomous ground vehicle (AGV), and or other arrangements that can transport totes 102a-102c and 104a-104c, and relocatable APSs 300 and 300a-300c. Thus, transport component 220 is operable to relocate relocatable APSs 300 and 300a-300c within ASRS 200.

Transport component 220 also includes a barcode reader 232 that reads barcodes 234 on totes 102a-102c and 104a-104c. (For clarity in FIG. 2, totes 102c and 104c and some other details from FIG. 1 are not shown.) Barcode reader 232 enables ASRS controller 210 to identify totes 102a-102c and 104a-104c. In some examples, additional or substitute identification sensors, such as an RFID sensor and tags, are used for identifying totes 102a-102c and 104a-104c. A position sensor 236 enables ASRS controller 210 to identify where transport component 220 has moved the various items being transported (e.g., totes 102a-102c and 104a-104c, and relocatable APSs 300 and 300a-300c). This permits instructing relocatable APSs 300 and 300a to move from transport component 220 to one of APS attachment points 206a-206d and/or instructing relocatable APSs 300 and 300a to load stored items into (or retrieve stored items from) one of totes 102a-102c and 104a-104c.

Additional details are indicated for relocatable APSs 300 and 300a, such as that relocatable APS 300 has an end effector 302 and a fastening component 304, and that APS 300a has an end effector 302a and a fastening component 304a. End effectors 302 and 302a are configured to handle some of stored items 208a-208f (see FIG. 1). Fastening components 304 and 304a are operable to affix relocatable APSs 300 and 300a, respectively, to APS attachment points 206a-206d. APSs 300b and 300c are similarly configured, although any of relocatable APSs 300 and 300a-300c may have differing end effectors. Additionally, a robotic arm 350 of relocatable APS 300 is identified. Further detail for relocatable APSs 300 is provided in the description of FIG. 3.

As illustrated, power couplings 230a-230d are located at each of APS attachment points 206a-206d, respectively, and are operable to provide power to the relocatable APSs 300 and 300a-300c. In some examples, power couplings 230a-230d include one or more of an electrical connector, a wireless power coupling, and a pneumatic coupling (for actuating elements operated by air pressure). Relocatable APSs 300 and 300a-300c each have a power receptacle 330 (see FIG. 3) that is configured to couple with power couplings 230a-230d to receive supplied power.

In some examples, end effector store 226 is reachable by transport component 220, so that any of relocatable APSs 300 and 300a-300c can replace its end effector with one of the plurality of end effectors 240, which include an end effector 242 that is a different type than end effector 302. In some examples, ASRS 200 also includes a communication component 238 operable to provide communication channels among ASRS controller 210, transport component 220, relocatable APSs 300 and 300a-300c, controller 110.

Figure 3:
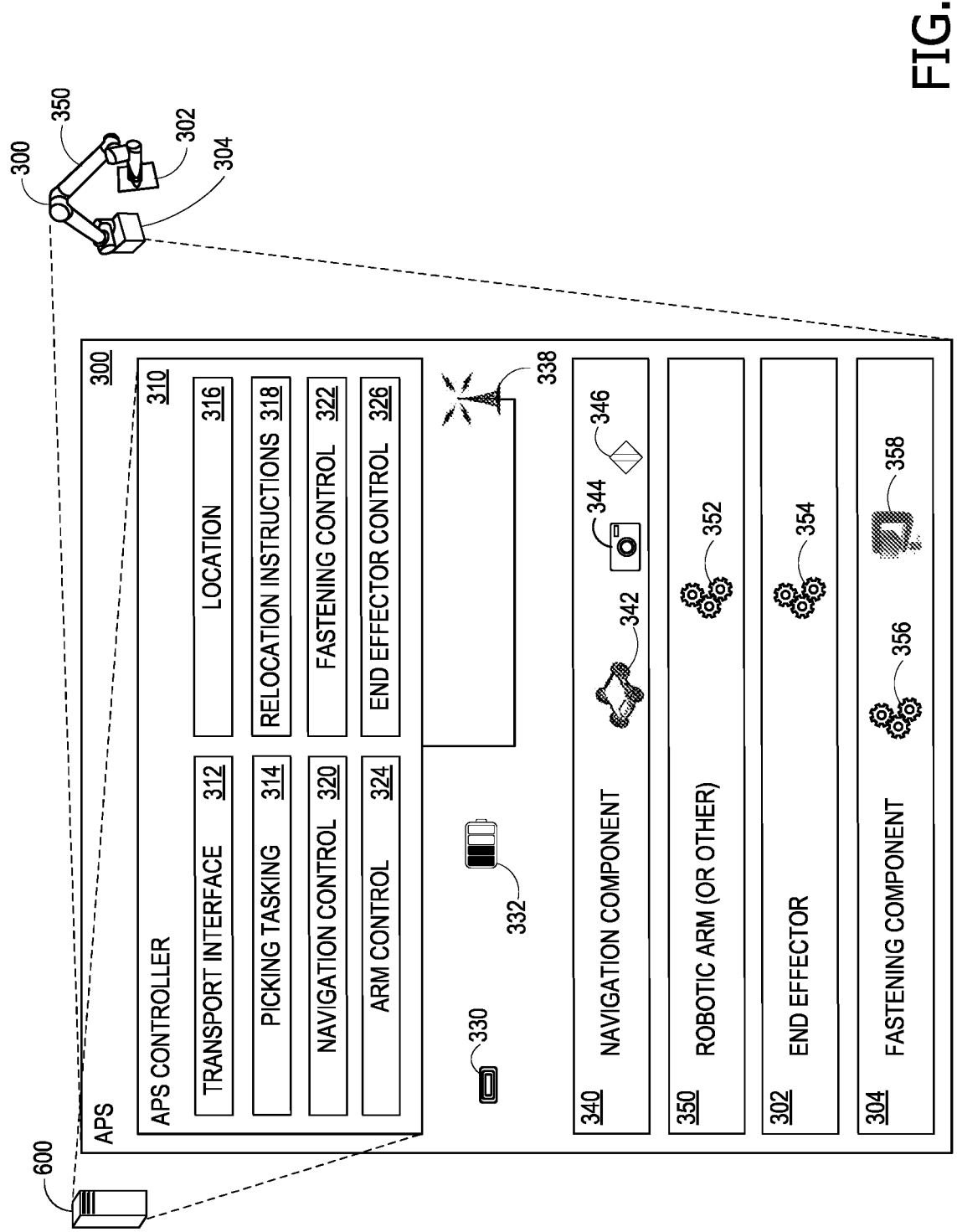
FIG. 3 illustrates a block diagram of an exemplary automated picking system (APS) useable within the ASRS of FIG. 2.

FIG. 3 illustrates a block diagram of relocatable APS 300. Relocatable APS 300 includes an APS controller 310, which in some examples, is implemented using at least a portion of a computing node 600 (of FIG. 6). APS controller 310 includes a transport interface 312, which enables relocatable APS 300 to coordinate the transportation (relocation) of relocatable APS 300 (within ASRS 200) with transportation component 210. In some examples, APS controller 310 uses a communication component 238 to provide a communication channel to communication component 238 (of FIG. 2) and/or communication component 108 (of FIG. 1). This communication enables relocatable APS 300 to receive picking tasking 314 and relocation instructions 318 from controller 110 (also of FIG. 1) and also to report its own location data 316 (its position) to controller 110. Power receptacle 330 is configured to couple with power couplings 230*a*-230*d* to receive supplied power in order to operate relocatable APS 300, although some examples additionally have a battery 332.

In some examples, a navigation control 320 controls the operation of a navigation component 340 that finely positions relocatable APS 300 relative to APS attachment points 206*a*-206*d*, so that fastening component 304 is properly aligned to affix APS 300 on one of APS attachment points 206*a*-206*d*. That is, proper alignment of relocatable APS 300 relative to an APS attachment point permits engagement of fastening component 304 with the nearby APS attachment point (e.g., one of APS attachment points 206*a*-206*d*). In some examples, navigation component 340 is also operable to disengage relocatable APS 300 from transport component 220. In some examples, transport component 220 is operable to disengage from relocatable APS 300 with or without assistance from navigation component 340.

In some examples, navigation component 340 includes a positioner 342 that is operable to move relocatable APS 300 or a portion (e.g., fastening component 304) as necessary to align fastening component 304 with an APS attachment point. In some examples, navigation component 340 includes a position sensor 344 (e.g., a computer vision (CV) sensor) that is operable to provide precise location information for controlling positioner 342. In some examples, navigation component 340 includes a contact sensor 346 that is operable to detect when fastening component 304 is positioned properly to be actuated, thereby affixing relocatable APS 300 to an APS attachment point. In some examples, a fastening control 322 controls the operation of fastening component 304 to detach from an APS attachment point and attach (affix, for example by a clamping action) to another APS attachment point. As illustrated, fastening component 304 includes an actuating mechanism 356 that controls actuating of an engagement portion, and a clamp 358 that engages an APS attachment point.

An arm control 324 controls the operation of robot arm 350 (although other mechanisms are used in alternative examples) to position end effector 302 relative to any stored items 208*a*-208*f* that are being handled (e.g., retrieved or placed) and also one of totes 102*a*-102*c* or 104*a*-104*c*. (See FIG. 1) As illustrated, robot arm 350 includes servo motors 352 (other actuating mechanisms) that are controlled by arm control 324. An end effector control 326 controls the operation of end effector 302, for example via actuating mechanisms 354. In some examples, end effector control 326 also controls the changing of end effectors.

As an example of operation, FIGS. 1-3 are described together as a single view. Relocatable APS 300 is affixed to APS attachment point 206*a* and receiving power via power coupling 230*a* and power receptacle 330, and is instructed by controller 110 to retrieve stored item 208*a* to place it in tote 104*c* on transport component 220. Controller 110 determines a need to also place stored items 208*b*, 208*c*, and 208*d* in tote 104*c*. Controller 110 identifies, using APS location data 116, that there is no relocatable APS at APS attachment points 206*b* or 206*c*, and so no relocatable APS can reach stored items 208*b*, 208*c*, and 208*d*. Controller 110 instructs relocatable APS 300 to relocate to APS attachment point 206*b*, and also tasks (instructs) relocatable APS 300 to retrieve stored items 208*b* and 208*c* for loading into tote 104*c*. Relocatable APS 300 detaches from APS attachment point 206*a*.

Transport component 220 transports tote 104*c* into position as needed, and also relocates (transports) relocatable APS 300, where relocatable APS 300 uses navigation component 340 for final positioning and affixes itself to APS attachment point 206*b*. After loading stored items 208*b* and 208*c*, relocatable APS 300 is available to relocate to APS attachment point 206*c*. However, end effector 302 is of the incorrect type to handle stored item 208*d*. Instead, end effector 242, located within end effector store 226, is suitable. So controller 110 instructs relocatable APS 300 to swap end effector 302 for end effector 226. Relocatable APS 300 relocates to end effector store 226, disengages end effector 302; engages end effector 242; and relocates (with transport component 220) within ASRS 200 to APS attachment point 206*c*. At a later time, controller 110 instructs relocatable APS 300*a* to move to a different APS attachment point, and instructs relocatable APS 300 to move to APS store and maintenance location 228 for repair or scheduled maintenance. In anticipation of an increased throughput requirement (see FIGS. 4A-4C), controller 110 instructs relocatable APSs 300*b* and 300*c* to move from APS store and maintenance location 228 to identified APS attachment points.

Figure 4A:
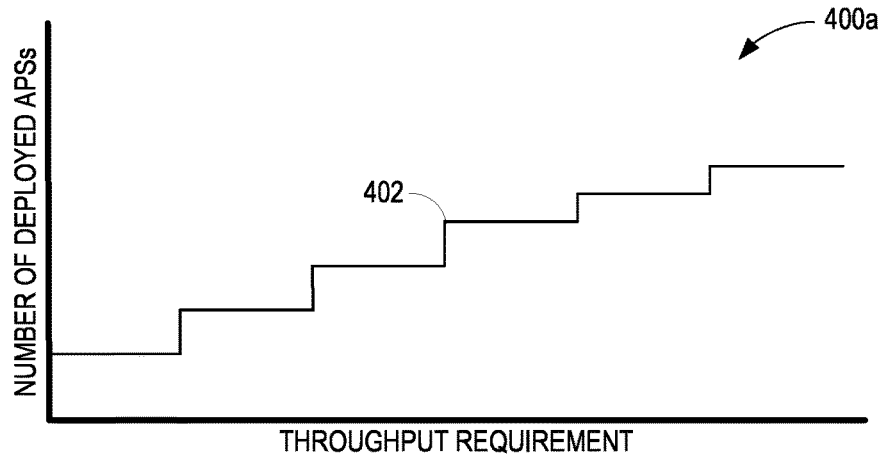
FIG. 4A is a plot of the number of the APSs (of FIG. 3) being deployed within the ASRS (of FIG. 2) varying based at least in part on a throughput requirement.

FIG. 4A is a plot 400*a* of the number of APSs 300 being deployed within ASRS 200 varying based at least in part on a throughput requirement, As can be seen with a stepped curve 402, the number of APSs needed generally increases with an increasing throughput requirement. Stepped curve 402 may not follow a linear relationship, however, as the ASRS becomes crowded. Space for additional APSs diminishes as more are added, and eventually a maximum number is reached.

Figure 4B:
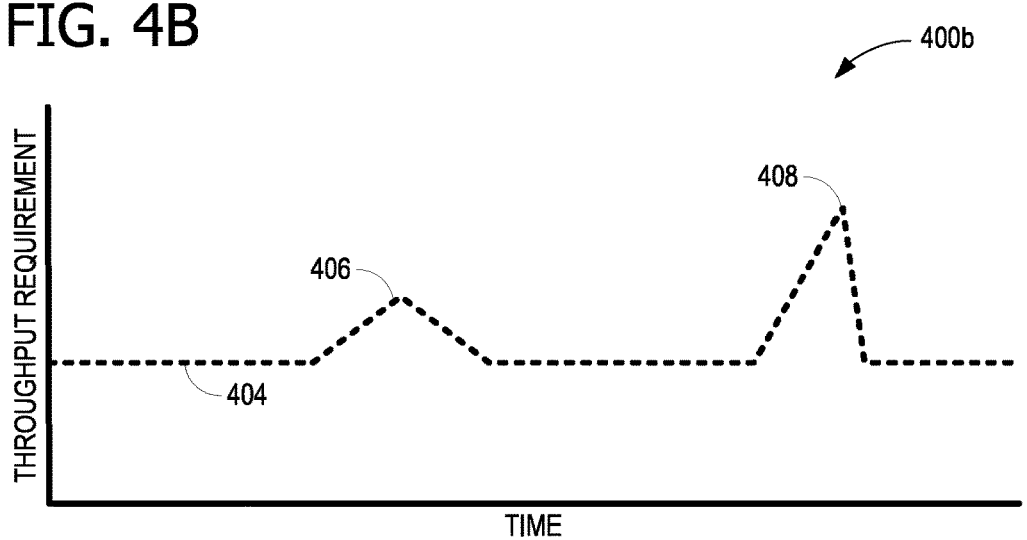
FIG. 4B is a plot of a notional throughput requirement as a function of time, in a retail setting.
Figure 4C:
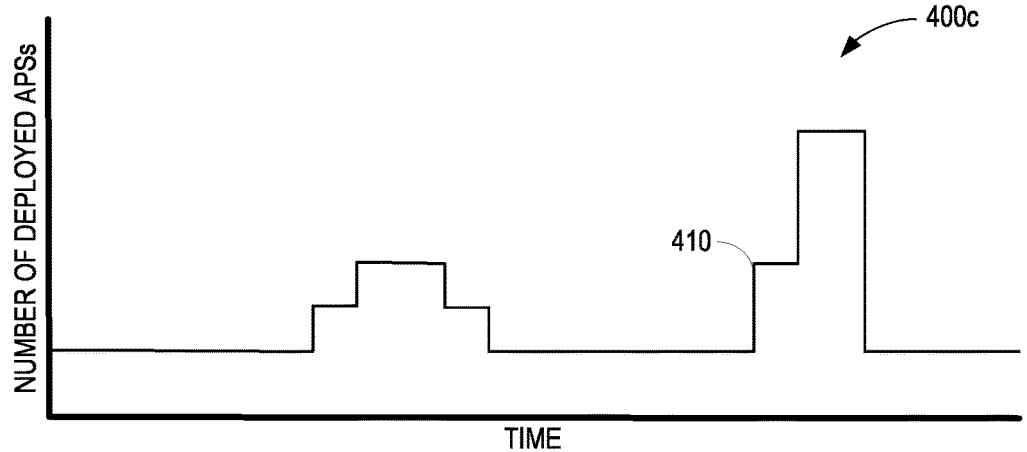
FIG. 4C is a plot of the number of the APSs (of FIG. 3) being deployed within the ASRS (of FIG. 2) varying based on the notional throughput requirement as a function of FIG. 4B.

FIG. 4B is a plot 400*b* of a notional throughput requirement as a function of time, in a retail setting. A throughput requirement curve 404 shows the demand placed on an ASRS, including seasonal peaks 406 and 408. FIG. 4C is a plot 400*c* of the number of APSs 300 being deployed within ASRS 200 varying based on throughput requirement curve 404. Referencing plots 400*a*, 400*b*, and 400*c* simultaneously, an operational scenario becomes apparent. An ASRS can operate sufficiently with a number (N) of deployed APS s during lower periods of retail demand. During seasonal peak 406, the number of deployed APSs should be increased, in order to maintain sufficient throughput capacity, and may be reduced afterward. For example, some APSs may be removed from deployment for maintenance. During seasonal peak 408, the number of deployed APSs should again be increased (but this time to a higher number), in order to maintain sufficient throughput capacity, and may again be reduced afterward.

Figure 5:
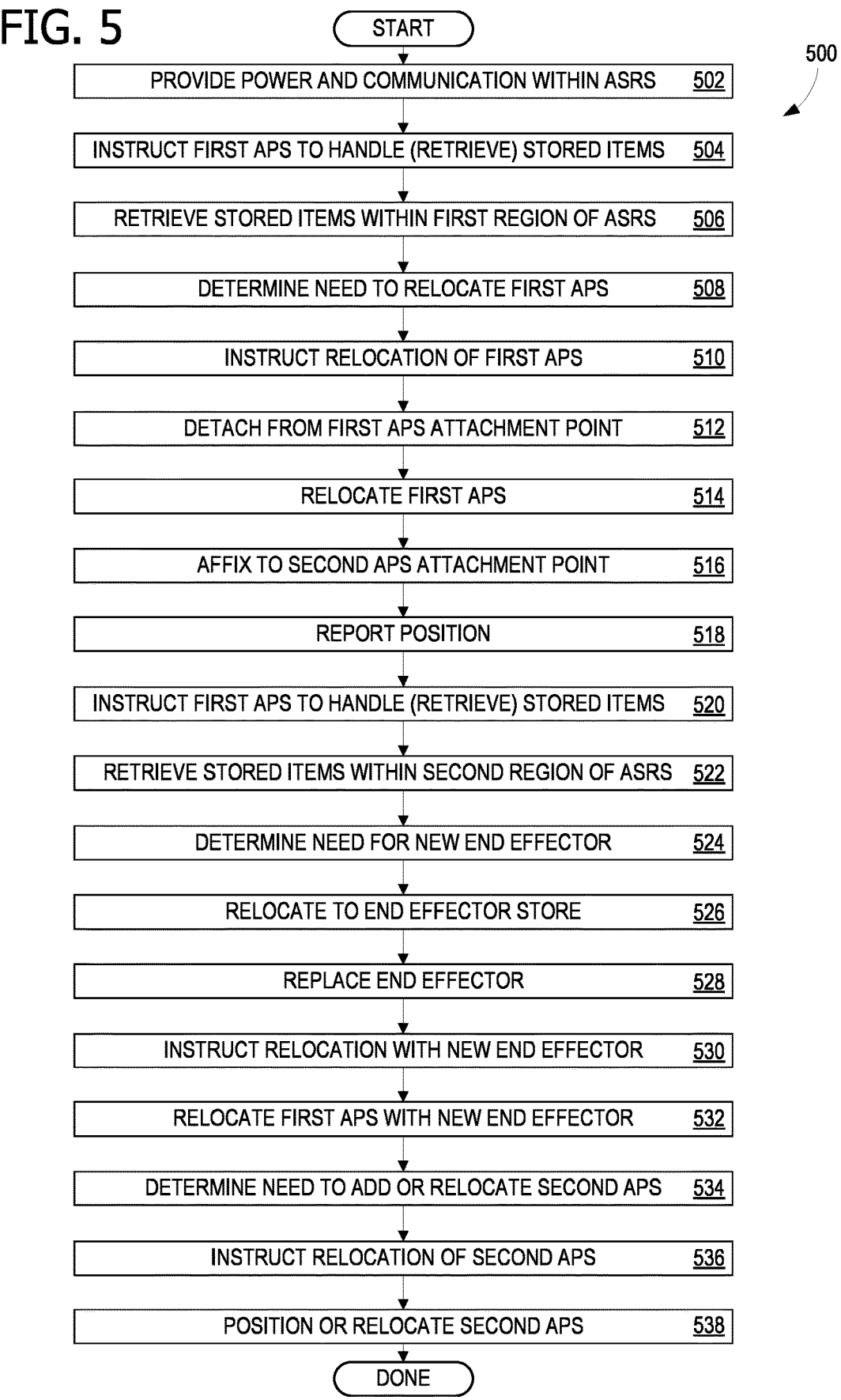
FIG. 5 shows a flow chart of exemplary operations associated with the automated in-rack picking arrangement of FIG. 1.

FIG. 5 shows a flow chart 500 of exemplary operations associated with the automated in-rack picking arrangement 100 (of FIG. 1). In some examples, some or all of the computer operations described for flow chart 500 are performed as computer-executable instructions on computing node 600 (see FIG. 6). Flow chart 500 commences with operation 502, which includes providing, at a first APS attachment point and a second APS attachment point (and other APS attachment points), power to the relocatable APSs at the attachment points. In some examples, a power coupling is operable to provide power to the relocatable APSs. In some examples, the power coupling comprises a coupling type selected from the list consisting of an electrical connector, a wireless power coupling, and a pneumatic coupling. In some examples, the relocatable APSs each include at least one power receptacle configured to couple with the power couplings at the APS attachment points. In some examples, operation 502 further includes providing a communication component that operable to provide a communication channel between the relocatable APSs and a controller.

Operation 504 includes instructing a first relocatable APS (currently located at the first APS attachment point) to retrieve stored items within a first subset of a plurality of storage locations within an ASRS. When the first relocatable APS complies, operation 506 includes retrieving, by the first relocatable APS stored items within a first subset of a plurality of storage locations within the ASRS. At some point, a need arises for the first relocatable APS to relocate from the first APS attachment point to the second APS attachment point. Thus, operation 508 includes determining a need for the first relocatable APS to relocate from the first one of a plurality of APS attachment points within the ASRS to the second one of the plurality of APS attachment points within the ASRS. Operation 510 then includes instructing, by a controller, relocation of the first relocatable APS from the first APS attachment point to the second APS attachment point. In some examples, instructing relocation of the first relocatable APS comprises the controller instructing the first relocatable APS. Based on the configuration, some examples of operation 510 also include the first relocatable APS instructing the transport component to relocate the first relocatable APS. In some examples, the controller instructs the transport component directly.

In preparation for relocating, operation 512 includes detaching, by the first relocatable APS, from the first APS attachment point. Operation 514 includes relocating, with a transport component, the first relocatable APS from the first APS attachment point to the second APS attachment point. When the first relocatable APS arrives at the second APS attachment point, based on the configuration, the first relocatable APS disengages from the transport component. In such examples, operation 514 also includes, based at least upon relocating the first relocatable APS within the ASRS, disengaging the transport component from the first relocatable APS. Also, in such examples, the transport component is operable to, based at least upon relocating the first relocatable APS within the ASRS, disengage from the first relocatable APS. In some examples, however, at least a portion of the transport component remains engaged (or a part of) the first relocatable APS.

Operation 516 includes affixing, with the first fastening component, the first relocatable APS to the second APS attachment point. In some examples, affixing the first relocatable APS to the second APS attachment point comprises actuating a clamp. In some examples, operation 516 includes fine navigation with a navigation component operable to position the first relocatable APS relative to each of the plurality of APS attachment points within the ASRS, to permit engagement of the first fastening component. In some examples, operation 516 further includes the first relocatable APS coupling to supplied power. Operation 518 includes based at least upon relocating within the ASRS, reporting, by the first relocatable APS, its position to the controller. Operation 518 also includes receiving, by the controller, a reported position of the first relocatable APS at the second APS attachment point.

With the first relocatable APS at the second APS attachment point, operation 520 includes instructing the first relocatable APS to retrieve stored items within a second subset of the plurality of storage locations within the ASRS. When the first relocatable APS complies, operation 522 includes retrieving, by the first relocatable APS, stored items within a second subset of the plurality of storage locations within the ASRS. At some point, a need arises for the first relocatable APS to change its end effector, for example to handle a different type of stored items, or if its current end effector requires maintenance. Thus, operation 524 includes determining a need for a new end effector. Operation 526 is the relocation of the first relocatable APS to an end effector store. In some examples, operation 526 includes the controller instructing relocation of the first relocatable APS to an end effector store and the first relocatable APS relocating, with the transport component, the first relocatable APS to an end effector store. In some examples, the end effector store has an end effector of a different type than the first end effector.

The end effector is replaced in operation 528. In some examples, operation 528 includes instructing replacing an end effector on the first relocatable APS; disengage the first end effector from the first relocatable APS; and engaging a third end effector with the first relocatable APS. In some examples, the third end effector is of a different type than the first end effector. Operation 530 includes instructing relocation of the first relocatable APS within the ASRS with the third end effector. In some examples, the controller provides the instructions. Operation 532 includes relocating, with the transport component, the first relocatable APS within the ASRS with the third end effector. Thus, in some examples, the first relocatable APS is operable to relocate, with the transport component, to the end effector store; disengage the first end effector; engage the third end effector; and relocate, with the transport component, within the ASRS with the third end effector.

A need to either add to the number of deployed APS s or to move a second relocatable APS is determined in operation 534. Thus, operation 536 includes instructing, by the controller, relocation of a second relocatable APS within the ASRS, the second relocatable APS having a second end effector and a second fastening component. The second relocatable APS has a second fastening component operable to affix the second relocatable APS to one of the plurality of APS attachment points within the ASRS. In some examples, the second relocatable APS has a second end effector of a different type than the first end effector. The second relocatable APS is then positioned or relocated within the ASRS in operation 538.

Exemplary Operating Environment

Figure 6:
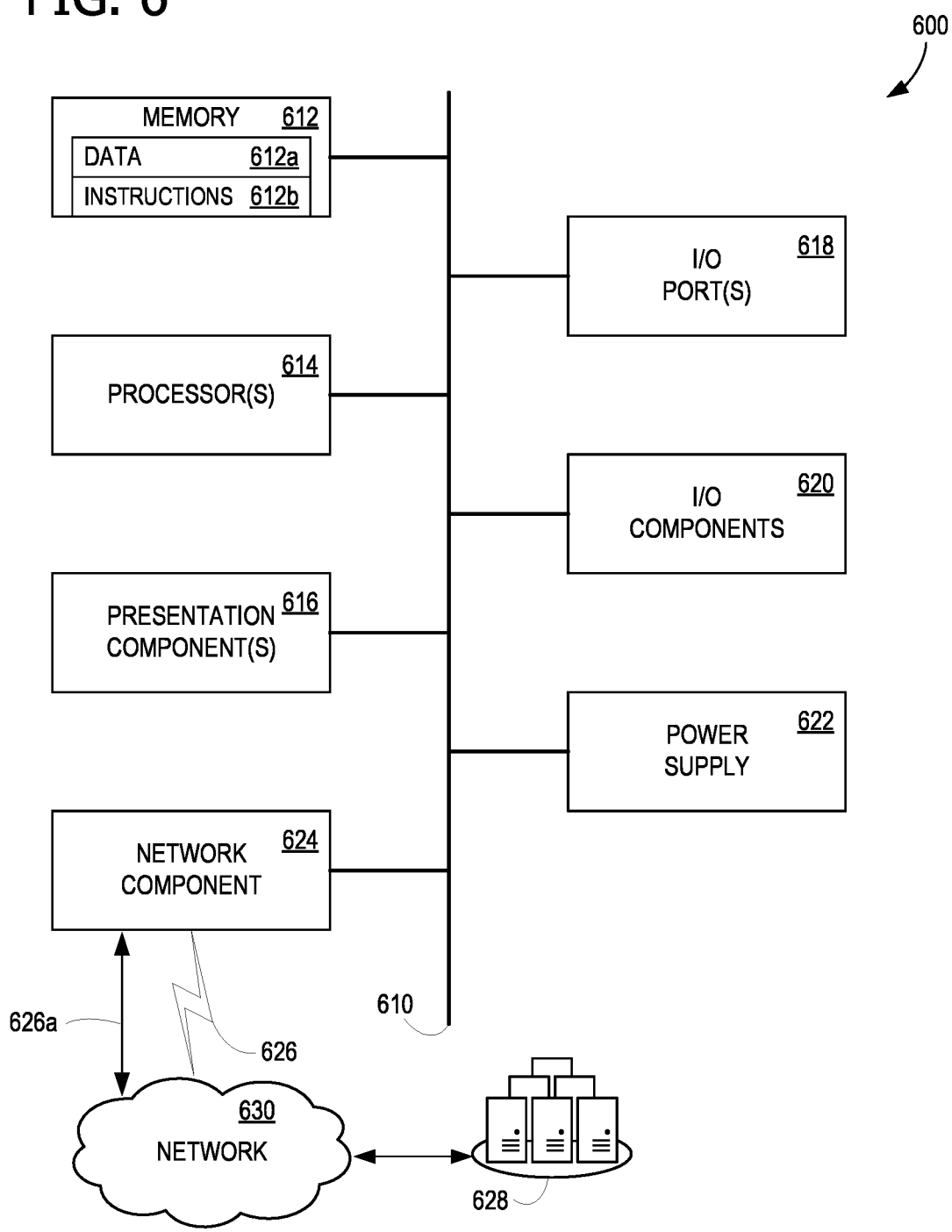
FIG. 6 is a block diagram of an example computing node for implementing aspects disclosed herein.

FIG. 6 is a block diagram of an example computing node 600 for implementing aspects disclosed herein and is designated generally as computing node 600. Computing node 600 is one example of a suitable computing environment and is not intended to suggest any limitation as to the scope of use or functionality of the invention. Neither should the computing node 600 be interpreted as having any dependency or requirement relating to any one or combination of components/modules illustrated. The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing nodes, etc. The disclosed examples may also be practiced in distributed computing environments, where tasks are performed by remote-processing devices that are linked through communications network 630.

Computing node 600 includes a bus 610 that directly or indirectly couples the following devices: memory 612, one or more processors 614, one or more presentation components 616, input/output (I/O) ports 618, I/O components 620, a power supply 622, and a network component 624. Computing node 600 should not be interpreted as having any dependency or requirement related to any single component or combination of components illustrated therein. While computing node 600 is depicted as a seemingly single device, multiple computing nodes 600 may work together and share the depicted device resources. That is, one or more computer storage devices having computer-executable instructions stored thereon may perform operations disclosed herein. For example, memory 612 may be distributed across multiple devices, processor(s) 614 may provide housed on different devices, and so on.

Bus 610 represents what may be one or more busses (such as an address bus, data bus, or a combination thereof). Although the various blocks of FIG. 6 are shown with lines for the sake of clarity, delineating various components can be accomplished with various other schemes. For example, a presentation component such as a display device can also be classified as an I/O component. Additionally, processors have internal memory. Thus, the diagram of FIG. 6 is merely illustrative of an exemplary computing node that can be used in connection with one or more embodiments. Distinction is not made between such categories as "workstation," "server," "laptop," "hand-held device," etc., as all are contemplated within the scope of FIG. 6 and the references herein to a "computing node" or a "computing device." Memory 612 may include any of the computer-readable media discussed herein. Memory 612 is used to store and access data 612a and instructions 612b operable to carry out the various operations disclosed herein. In some examples, memory 612 includes computer storage media in the form of volatile and/or nonvolatile memory, removable or non-removable memory, data disks in virtual environments, or a combination thereof.

Processor(s) 614 may include any quantity of processing units that read data from various entities, such as memory 612 or I/O components 620. Specifically, processor(s) 614 are programmed to execute computer-executable instructions for implementing aspects of the disclosure. The instructions may be performed by the processor, by multiple processors within the computing node 600, or by a processor external to the client computing node 600. In some examples, the processor(s) 614 are programmed to execute instructions such as those illustrated in the flowcharts discussed below and depicted in the accompanying drawings. Moreover, in some examples, the processor(s) 614 represent an implementation of analog techniques to perform the operations described herein. For example, the operations may be performed by an analog client computing node 600 and/or a digital client computing node 600.

Presentation component(s) 616 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly among multiple computing nodes 600, across a wired connection, or in other ways. Ports 618 allow computing node 600 to be logically coupled to other devices including I/O components 620, some of which may be built in. Example I/O components 620 include, for example but without limitation, a microphone, keyboard, mouse, joystick, game pad, satellite dish, scanner, printer, wireless device, etc.

In some examples, the network component 624 includes a network interface card and/or computer-executable instructions (e.g., a driver) for operating the network interface card. Communication between the computing node 600 and other devices may occur using any protocol or mechanism over any wired or wireless connection. In some examples, the network component 624 is operable to communicate data over public, private, or hybrid (public and private) network 630 using a transfer protocol, between devices wirelessly using short range communication technologies (e.g., near-field communication (NFC), Bluetooth® branded communications, or the like), or a combination thereof. Network component 624 communicates over wireless communication link 626 and/or a wired communication link 626a to a cloud resource 628 across network 630. Various different examples of communication links 626 and 626a include a wireless connection, a wired connection, and/or a dedicated link, and in some examples, at least a portion is routed through the internet.

Although described in connection with an example computing node 600, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing nodes, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device or computing node when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Exemplary Operating Methods and Systems

An exemplary system for automated in-rack picking comprises: a plurality of storage locations for stored items within an ASRS; a first relocatable APS having a first end effector and a first fastening component operable to affix the first relocatable APS to a first one of a plurality of APS attachment points within the ASRS, wherein the first relocatable APS is positioned to reach stored items within a first subset of the plurality of storage locations within the ASRS when the first relocatable APS is affixed to the first APS attachment point; a transport component operable to relocate the first relocatable APS within the ASRS to a second one of the plurality of APS attachment points within the ASRS, wherein the first relocatable APS is positioned to reach stored items within a second subset of the plurality of storage locations within the ASRS when the first relocatable APS is affixed to the second APS attachment point; and a controller operable to instruct relocation of the first relocatable APS from the first APS attachment point to the second APS attachment point.

An exemplary method of automated in-rack picking comprises: retrieving, by a first relocatable APS having a first end effector and a first fastening component, stored items within a first subset of a plurality of storage locations within an ASRS; determining a need for the first relocatable APS to relocate from a first one of a plurality of APS attachment points within the ASRS to a second one of the plurality of APS attachment points within the ASRS; instructing, by a controller, relocation of the first relocatable APS from the first APS attachment point to the second APS attachment point; detaching, by the first relocatable APS, from the first APS attachment point; relocating, with a transport component, the first relocatable APS from the first APS attachment point to the second APS attachment point; affixing, with the first fastening component, the first relocatable APS to the second APS attachment point; and retrieving, by the first relocatable APS, stored items within a second subset of the plurality of storage locations within the ASRS.

An exemplary computer storage device has computer-executable instructions stored thereon for automated in-rack picking, which, on execution by a computer, cause the computer to perform operations comprising: instructing a first relocatable APS to retrieve stored items within a first subset of a plurality of storage locations within an ASRS; determining a need for the first relocatable APS to relocate from a first one of a plurality of APS attachment points within the ASRS to a second one of the plurality of APS attachment points within the ASRS; instructing relocation of the first relocatable APS from the first APS attachment point to the second APS attachment point; receiving a reported position of the first relocatable APS at the second APS attachment point; instructing the first relocatable APS to retrieve stored items within a second subset of the plurality of storage locations within the ASRS; instructing relocation of the first relocatable APS to an end effector store; instructing replacing an end effector on the first relocatable APS; instructing relocation of the first relocatable APS within the ASRS with the third end effector; and instructing relocation of a second relocatable APS within the ASRS.

Alternatively, or in addition to the other examples described herein, examples include any combination of the following:

the first APS comprises a robotic arm;

the first fastening component comprises a clamp;

at each of the plurality of APS attachment points, a power coupling operable to provide power to the first relocatable APS;

the first relocatable APS further comprises a power receptacle configured to couple with the power coupling at an APS attachment point of the plurality of APS attachment point;

the power coupling comprises a coupling type selected from the list consisting of an electrical connector, a wireless power coupling, and a pneumatic coupling;

a communication component operable to provide a communication channel between the first relocatable APS and the controller;

the first relocatable APS is configured to, based at least upon relocating within the ASRS, report its position to the controller;

a navigation component operable to position the first relocatable APS relative to each of the plurality of APS attachment points within the ASRS to permit engagement of the first fastening component;

a second relocatable APS having a second end effector of a different type than the first end effector, the second relocatable APS having a second fastening component operable to affix the second relocatable APS to one of the plurality of APS attachment points within the ASRS;

the transport component is further operable to, based at least upon relocating the first relocatable APS within the ASRS, disengage from the first relocatable APS;

an end effector store having a third end effector of a different type than the first end effector;

the first relocatable APS is operable to relocate, with the transport component, to the end effector store; disengage the first end effector; engage the third end effector; and relocate, with the transport component, within the ASRS with the third end effector;

instructing relocation of the first relocatable APS comprises the controller instructing the first relocatable APS;

the first relocatable APS instructing the transport component to relocate the first relocatable APS;

the first APS comprises a robotic arm and wherein affixing the first relocatable APS to the second APS attachment point comprises actuating a clamp;

providing, at the first APS attachment point and the second APS attachment point, power to the first relocatable APS;

based at least upon relocating within the ASRS, reporting, by the first relocatable APS, its position to the controller;

instructing, by the controller, relocation of a second relocatable APS within the ASRS, the second relocatable APS having a second end effector and a second fastening component;

based at least upon relocating the first relocatable APS within the ASRS, disengaging the transport component from the first relocatable APS;

relocating, with the transport component, the first relocatable APS to an end effector store;

disengaging the first end effector from the first relocatable APS;

engaging a third end effector with the first relocatable APS, the third end effector of a different type than the first end effector; and relocating, with the transport component, the first relocatable APS within the ASRS with the third end effector.

The order of execution or performance of the operations in examples of the disclosure illustrated and described herein may not be essential, and thus may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. An automated in-rack picking system, the system comprising:
    a robotic arm;
    an end effector removably attached to an end of the robotic arm;
    a fastening component coupled to another end of the robotic arm and operable to removably attach the robotic arm to an attachment point within an automated storage structure, wherein the robotic arm is positioned at the attachment point to reach stored items within a first location of the automated storage structure, and wherein the robotic arm is relocated via a transport component to another attachment point to reach other stored items within a second location of the automated storage structure, the robotic arm being removably attached to the other attachment point via the fastening component; and
    a power coupling located at the attachment point, the power coupling providing power to the robotic arm attached to the attachment point.

2. The system of claim 1 further comprising:
    a controller that controls the transport component to relocate the robotic arm within the automated storage structure.

3. The system of claim 1 wherein the transport component relocates another robotic arm to the attachment point, the other robotic arm having another end effector different from the end effector of the robotic arm.

4. The system of claim 1 wherein the power coupling comprises a coupling type selected from the list consisting of:
    an electrical connector, a wireless power coupling, and a pneumatic coupling.

5. The system of claim 1 further comprising:
    a communication component that provides a communication channel between the robotic arm and the controller.

6. The system of claim 5 wherein the robotic arm reports its position to the controller.

7. The system of claim 1 further comprising:
    a navigation component coupled to the robotic arm, the navigation component positioning the robotic arm relative to the attachment point to permit engagement of the fastening component with the attachment point.

8. The system of claim 7 wherein the navigation component is operable to disengage the robotic arm from the transport component upon the relocation.

9. The system of claim 7 wherein the navigation component further comprises:
    a position sensor that provides location information; and
    a contact sensor that detects proper positioning of the fastening component to the attachment point.

10. The system of claim 1 further comprising:
    an end effector store having a third end effector of a different type than the end effector and the other end effector, wherein the robotic arm is relocated to the end effector store to interchangeably engage with the third end effector.

11. A method for automated in-rack picking, the method comprising:
    controlling, by a controller, location of a first relocatable automated picking system (APS) having a first end effector and a first fastening component at a first location of an automated storage structure, wherein the first relocatable APS is removably attached to a first attachment point at the first location;
    instructing the first relocatable APS to retrieve stored items within the first location;
    determining, by the controller, a need for the first relocatable APS to relocate from the first location within the automated storage structure to a second location;
    controlling relocation of the first relocatable APS from the first location to the second location, including by decoupling the first relocatable APS from a first attachment point at the first location and coupling the first relocatable APS to a second attachment point at the second location via the first fastening component;

instructing the first relocatable APS to retrieve other stored items within the second location of the automated storage structure; and providing, at the first attachment point and the second attachment point, power to the first relocatable APS.

12. The method of claim 11 wherein controlling the relocation of the first relocatable APS further comprises instructing a transport component to relocate the first relocatable APS from the first location to the second location.

13. The method of claim 11 wherein the first relocatable APS comprises a robotic arm.

14. The method of claim 11 further comprising:

based at least upon the relocating, reporting, by the first relocatable APS, a current position to the controller.

15. The method of claim 11 further comprising:

controlling relocation of a second relocatable APS within the automated storage structure, the second relocatable APS having a second end effector and a second fastening component.

16. The method of claim 11 further comprising:

positioning, by a navigation component, the first relocatable APS relative to the first attachment point to permit engagement of the first fastening component with the first attachment point.

17. The method of claim 11 further comprising:

controlling another relocation of the first relocatable APS to an end effector store;

instructing the first relocatable APS to disengage the first end effector;

instructing the first relocatable APS to engage a third end effector, the third end effector of a different type than the first end effector.

18. One or more computer storage devices having computer-executable instructions stored thereon for automated in-rack picking, which, on execution by a computer, cause the computer to perform operations comprising:

controlling a location of a first relocatable automated picking system (APS) having a first end effector and a first fastening component at a first location of an automated storage structure, wherein the first relocatable APS is removably attached to a first attachment point at the first location;

instructing the first relocatable APS to retrieve stored items within the first location; determining, by the controller, a need for the first relocatable APS to relocate from the first location within the automated storage structure to a second location;

controlling relocation of the first relocatable APS from the first location to the second location, including by decoupling the first relocatable APS from a first attachment point at the first location and coupling the first relocatable APS to a second attachment point at the second location via the first fastening component;

instructing the first relocatable APS to retrieve other stored items within the second location of the automated storage structure; and providing, at the first attachment point and the second attachment point, power to the first relocatable APS.

* * * * *